United States Patent [19]

White et al.

[11] 4,032,928
[45] June 28, 1977

[54] WIDEBAND INK JET MODULATOR

[75] Inventors: John T. White, Grand Prairie; Kenneth T. Lovelady, Irving, both of Tex.

[73] Assignee: Recognition Equipment Incorporated, Dallas, Tex.

[22] Filed: Aug. 12, 1976

[21] Appl. No.: 713,763

[52] U.S. Cl. .............................. 346/140 R; 346/75; 29/156.4 R
[51] Int. Cl.² .................. G01D 15/18; B23P 15/00
[58] Field of Search ............................ 346/75, 140; 29/156.4 R

[56] References Cited

UNITED STATES PATENTS

| | | | |
|---|---|---|---|
| 3,747,120 | 7/1973 | Stemme | 346/75 |
| 3,848,118 | 11/1974 | Rittberg | 346/140 X |
| 3,852,773 | 12/1974 | Sicking et al. | 346/140 |
| 3,871,004 | 3/1975 | Rittberg | 346/75 |
| 3,900,162 | 8/1975 | Titus et al. | 346/75 X |
| 3,940,773 | 2/1976 | Mizoguchi et al. | 346/140 R X |
| 3,958,255 | 5/1976 | Chion et al. | 346/75 X |

OTHER PUBLICATIONS

Lee, H. C. et al; High–Speed Droplet Generator, IBM Tech. Disclosure Bulletin, vol. 15, No. 3, August 1972, p. 909.

Primary Examiner—George H. Miller, Jr.
Attorney, Agent, or Firm—John E. Vandigriff

[57] ABSTRACT

A modulator for ink jet printers is provided for operation over a wide bandwidth of high frequency drop rates. The longitudinal dimensions of each part of the modulator are made small compared to the wavelength of the shortest standing longitudinal acoustic wave that may be produced in a structure of the same material as the part in question. A piezoelectric crystal is seated within a mount acoustically decoupled at the edges therof. An electrode is axially aligned with the crystal and placed in contact with the crystal. A short hollow cylinder forms an ink chamber axially aligned with the crystal. The end of the ink chamber opposite the crystal is closed by a front plate having a nozzle axially located therein.

Plural nozzles may be utilized to produce parallel ink streams which break into droplets at substantially the same time and at a near uniform distance from the nozzles.

15 Claims, 8 Drawing Figures

WIDEBAND INK JET MODULATOR

FIELD OF THE INVENTION

The invention relates to ink droplet generation systems, and more particularly to an ink jet modulator dimensioned to operate with uniform characteristics over a wide frequency band.

PRIOR ART

In ink jet printers, an ink jet gun projects charged ink droplets which are deflected to form an information pattern on a moving document surface. When the transport velocity changes, it is necessary to provide a corresponding change in the drop rate.

Typical of the prior modulation systems are those disclosed in U.S. Pat. Nos. 3,927,410; 3,871,004; 3,848,118; 3,787,884; and 3,747,120.

Heretofore ink modulators associated with ink jet printers have been electromechanically tuned to a particular drop rate. Any deviation in operation from the tuned frequency has been accompanied by a deterioration in the modulator efficiency. Intolerable changes occur in the distance between a nozzle and a droplet break-off point. Variation in distance of the break-off point from the nozzle affects the drop charging function. Poor quality printing has resulted. Prior modulator systems also have been characterized by acute sensitivity to temperature changes, and a propensity for generating satellite droplets about the primary ink jet stream.

In prior systems tuned to a particular drop frequency, changes in drop rate to accommodate a change in transport speed has been reflected by a degradation of print quality.

In the development of multiple nozzle configurations, complex systems having plural transducer-diaphragm combinations have been required. U.S. Pat. No. 3,708,798 discloses a multiple nozzle printer having a plurality of piezoelectric transducers secured to a like plurality of diaphragms which pulsate ink toward a set of nozzles. In U.S. Pat. No. 3,900,162 an ink gun comprised of a diamond-shaped ink chamber feeds multiple orifices to form droplets at approximately the same time and at a near uniform distance from the orifices. The diamond-shaped chamber is divided along its diagonal by a vibrating member and has a plurality of transducers affixed to one side of the member. As with the prior single nozzle configurations, a sensitivity to changes in temperature and pressure is aggravated by a shift of the drop frequencies from a narrow operating range about the modulator tuned frequency. Printing aberrations then occur, and attempts to provide a uniform print quality at each of the multiple nozzles is subverted by the random shifts in distance from the nozzle of the break-off point.

In the present invention, a wideband ink jet modulator is provided which has reliable operating characteristics over a wide band of drop frequencies. Over the operational range, the occurrence of satellite droplets may be substantially eliminated, and changes in temperature, ink pressure and drop rates may be accommodated without degrading the quality of print. Further, plural orifices may be serviced without sacrificing either the simplistic construction or the efficient operation of the modulator.

SUMMARY OF THE INVENTION

An ink jet modulator comprises an integrated structure in which an electrical transducer is seated within a mount and acoustically decoupled on the edges. A thin diaphragm is located adjacent to the transducer. A short hollow cylinder forms an ink chamber axially aligned with the transducer and placed on the side of the diaphragm opposite the transducer. A nozzle plate closes the ink chamber.

The longitudinal dimensions of the mount, crystal, diaphragm, cylinder, and nozzle plate are made small with respect to the wavelength of the shortest standing longitudinal acoustic wave that may be established in a structure of the same material as the part in question. The overall longitudinal dimensions of the integrated modulator structure are likewise small. Mechanical resonance frequencies thereby are above the operating frequency band. As a result, the break-off point is controllable over the operating range. A substantially increased tolerance to drop rate, temperature and ink pressure changes is provided. In addition, the ink jet stream becomes substantially free of satellite drops.

In a further aspect, a modulator having a single transducer and a single diaphragm has multiple nozzles to operate over a wide band of high frequency ink drop rates. Parallel ink streams are provided thereby which break into droplets at substantially the same time and at a near uniform distance from the nozzles.

DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF PREFERRED EMBODIMENTS

FIG. 1

Figure 1:
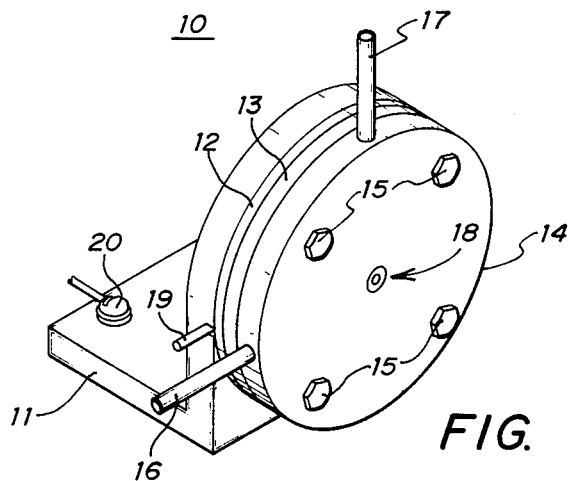
FIG. 1 is a perspective view of an ink modulator embodying the invention.

FIG. 1 is an isometric view of an ink modulator 10 embodying the present invention. An L-shaped mount 11 has a thin diaphragm 12, an ink chamber disc 13, and a front nozzle plate 14 secured to one face thereof by bolts 15. An ink inlet tube 16 and a purge tube 17 lead to passages in nozzle plate 14. Centrally located on the longitudinal axis of the nozzle plate 14 is an ink nozzle 18, which in the preferred embodiment described herein is made of ruby. A transducer drive lead 19 extends from mount 11. A second drive lead 20 is connected to the upper face of the bottom member of mount 11.

In operation, ink is admitted into inlet tube 16 under pressure while the purge tube 17 is opened to purge any solvent from the modulator. Purge tube 17 is then closed and the ink thereafter exits only through the nozzle 18.

Figure 2:
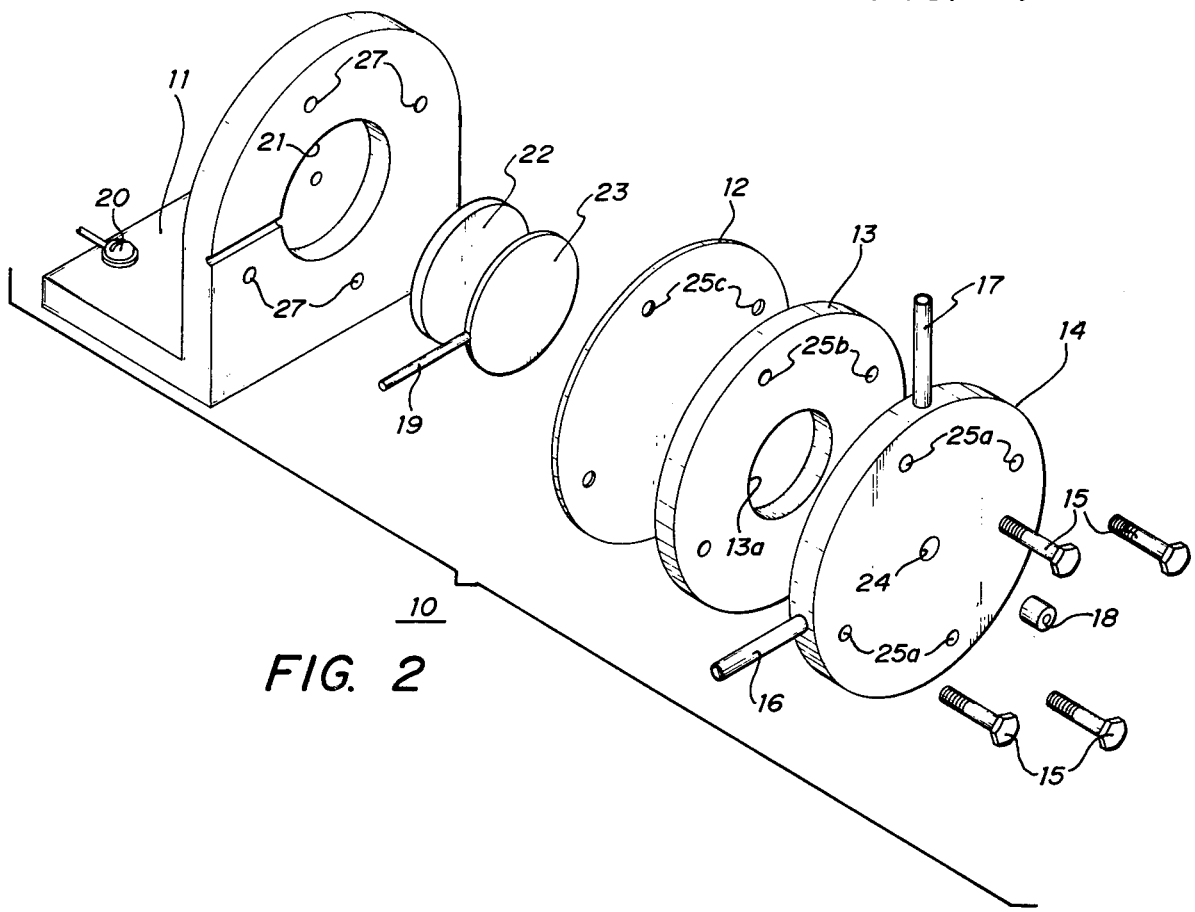
FIG. 2 is an exploded perspective view of the ink modulator of FIG. 1.
Figure 3:
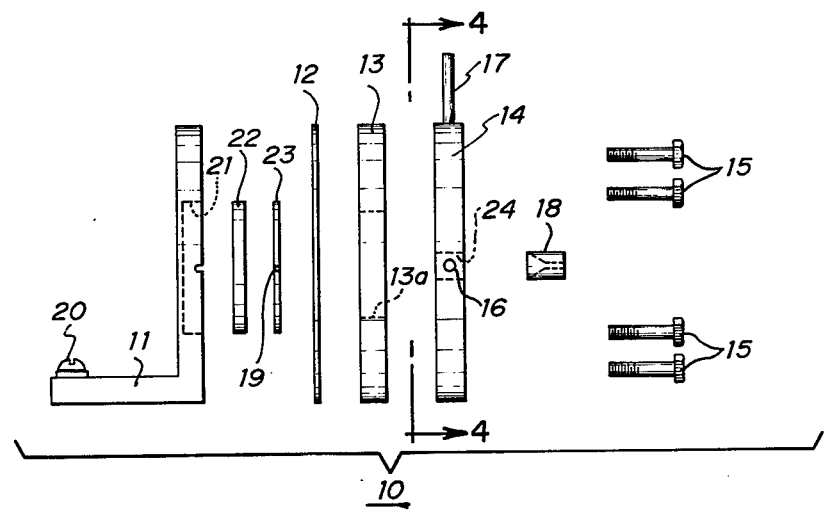
FIG. 3 is an exploded side view of the ink modulator of FIG. 1.

FIGS. 2 and 3

FIG. 2 is an exploded isometric view of the ink modulator of FIG. 1, and FIG. 3 is an exploded side view thereof.

Mount 11 has a well 21 formed therein for seating a transducer 22 and a disc shaped electrode 23. Preferably, transducer 22 is a piezoelectric crystal operated in the longitudinal mode at a frequency below its radial and longitudinal resonance. The transducer is seated in well 21 with a conductive bonding agent such as silver epoxy, and a low acoustical impedance material such as a casting epoxy is applied to the edges of the transducer to provide an acoustical decoupling of radial vibrations from mount 11. The conductive bonding agent then is applied to the face of the transducer and electrode 23 is placed in contact with the transducer within well 21.

The diaphragm 12 is adhered to electrode 23 with a suitable adhesive. One end of disc 13 is placed in contact with diaphragm 12 to close a central bore 13a, thereby forming an ink reservoir or cavity. Nozzle plate 14 having a nozzle bore 24 is in contact with disc 13 at the opposite face. Nozzle 18 is seated within nozzle bore 24. Nozzle plate 14, disc 13 and diaphragm 12 are secured to mount 11 by bolts 15 passing through bores 25a in nozzle plate 14, through bores 25b in disc 13 and bores 25c in diaphragm 12, and into threaded bores 27 in mount 11.

In the preferred embodiment described herein, mount 11 and nozzle plate 14 are made of stainless steel, electrode 23 is made of brass, and diaphragm 12 and disc 13 are made of polytetrafluoroethylene (PTFE). Diaphragm 12 is adhered to the electrode 23 with a PTFE adhesive. The PTFE and stainless steel materials are employed because they are chemically passive relative to the inks normally used.

As used herein, the word polytetrafluoroethylene (PTFE) refers to a polymer which is produced from the high polymerization of tetrafluoroethylene (TFE) and which exhibits a resistance to alkali, acids and solvents. It is understood that other materials having similar chemical properties may be substituted.

FIG. 4

Figure 4:
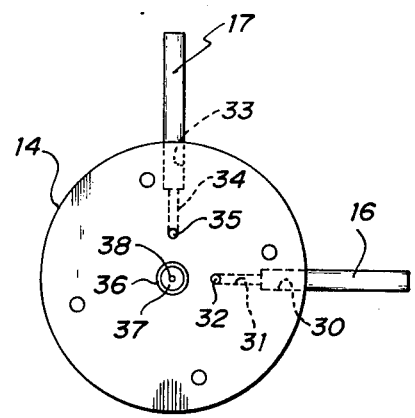
FIG. 4 is a rear plan view of the front plate of the ink modulator of FIG. 1.

FIG. 4 is a plan view of the inner face of nozzle plate 14 taken along lines 4—4 of FIG. 3. Ink inlet tube 16 is press fitted within a transverse reentrant bore 30 in nozzle plate 14. The smaller section 31 of bore 30 intersects a fluid channel 32 normal to bore 31 to complete a fluid path to the bore 13a of disc 13.

The purge tube 17 is press fitted into a transverse reentrant bore 33 in nozzle plate 14 with the axis thereof 90° from the axis of bore 30. The smaller section 34 of bore 33 intersects bore 34 to complete a second fluid channel 35 leading to bore 13a of disc 13. It is to be understood that bores 30 and 33 need not be normal to each other, but only need to be displaced one from the other.

A jewel nozzle 36 is mounted in nozzle plate 14. Nozzle 36 has a conical bore 37 converging to a small orifice 38.

A modulator according to the invention and constructed with a stainless steel mount 11 has a well 21 measuring about 0.40 inch in diameter and 0.038 inch in depth. Leading from the well 21 to an outer perimeter of the mount is an electrical contact slot approximately 0.0313 inch wide and 0.0313 inch deep. Transducer 22 is a piezoelectric crystal manufactured and sold by Channel Industries, Inc. of Santa Barbara, California and identified as Channelite 5400 transducer material.

The electrode 23 is a circular brass disc approximately 0.005 inch thick and 0.375 inch in diameter. Lead 19 is about 0.25 inch long and 0.03 inch wide. The diaphragm 12 is a PTFE diaphragm of about 0.75 inch. The bore 13a is formed in a PTFE disc 13 having a length of approximately 0.010 inch, an outer diameter of about 0.75 inch and a bore diameter of about 0.375 inch.

The nozzle plate 14 is formed from stainless steel having a thickness of about 0.090 inch and an outer diameter of about 0.75 inch. The ink inlet tube 16 and quick purge tube 17 are of stainless steel and are 0.042 inch in diameter. Tubes 16 and 17 are press fitted to a depth of approximately 0.150 inch into bores 30 and 33, respectively. Bores 30 and 33 are about 0.041 inch in diameter and 0.150 inch in depth. Sections 31 and 34 are about 0.025 inch in diameter and 0.07 inch in length, and fluid channels 32 and 35 each are approximately 0.025 inch in diameter and 0.045 inch in depth.

The jewel nozzle 36 is formed from a ruby cylinder approximately 0.03 inch in length and 0.046 inch in diameter. The nozzle includes a central conical bore 37 which is about 0.03 inch maximum diameter. Bore 37 converges to an orifice 38 of approximately 0.002 inch in diameter.

A wide variety of substitute materials will be satisfactory. For example, nozzle 18 may be formed from other materials including but not limited to sapphire, quartz, glass, ceramic, or stainless steel. Further, when a stainless steel nozzle plate is used, nozzle 18 may be formed directly in the nozzle plate 14. Tubes 16 and 17 may be of any material which is chemically inactive with the ink used.

FIG. 5

Figure 5:
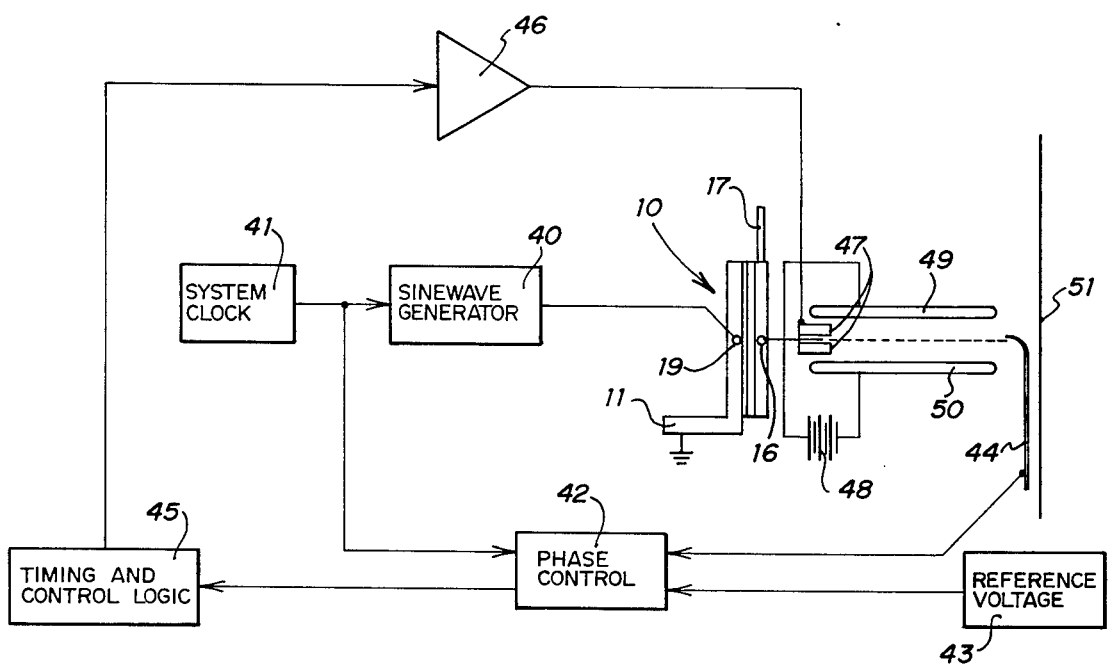
FIG. 5 is a functional block diagram of an ink printing system including the ink modulator of FIG. 1.

FIG. 5 is a functional block diagram of an ink jet printing system including a modulator embodying the present invention.

Mount 11 of modulator 10 is connected to ground, and the contact lead 19 of electrode 23 is connected to the output of a sinewave generator 40. A system clock 41 is connected to an input of generator 40 and to an input of a phase control unit 42. Phase control unit 42 receives a threshold voltage from a reference voltage unit 43 and a second voltage from an ink catcher 44. The phase control unit 42 compares the reference voltage with the voltage formed by ink droplets impinging upon catcher 44, and generates a phase control signal which is forwarded to a timing and control logic unit 45. Logic unit 45 generates a stairstep voltage in response to phase control unit 42 and forwards the voltage to a voltage amplifier 46. The output of amplifier 46 is applied to droplet charge plates 47. A voltage source 48 applies a voltage across two spaced deflection plates 49 and 50 to create an electrostatic field for deflecting charged ink droplets.

For a more detailed explanation of the system of FIG. 5, reference may be made to U.S. Pat. No. 3,596,276 assigned to the assignee of the present invention.

In operation, ink is admitted into ink inlet tube 16 under pressure, and the quick purge tube 17 is opened to purge any solvent from the modulator 10. The purge tube then is closed.

Generator 40 produces a sinewave in response to system clock 41 to excite the transducer 22 of modulator 10. The transducer vibrates at the sinewave frequency to form a pressure wave within the ink cavity of ink chamber 13a. The pressure wave is transmitted through the nozzle and down the ink stream until the stream breaks into droplets. As the droplets emanate from modulator 10, they pass between charge plates 47 and deflection plates 49 and 50. Deflection by the electrostatic field between plates 49 and 50 increases with increased charge voltage across charge plates 47. Uncharged ink droplets, however, are not affected by the electrostatic field between plates 49 and 50, and flow without deflection into catcher 44. Charged droplets impinge paper 51.

Phase control unit 42 compares a voltage formed on ink catcher 44 by impinging charged droplets with the reference voltage from unit 43, which may be representative of a desired relationship between the droplet break-off point and the charging voltage. If the voltages are equal, the charging voltage output by amplifier 46 and the crystal excitation voltage output by generator 40 are synchronized. If the voltages are not equal, however, phase control unit 42 induces a phase delay in the charging voltage. A suitable phase control system is described in U.S. Pat. No. 3,596,276.

FIG. 6

Figure 6:
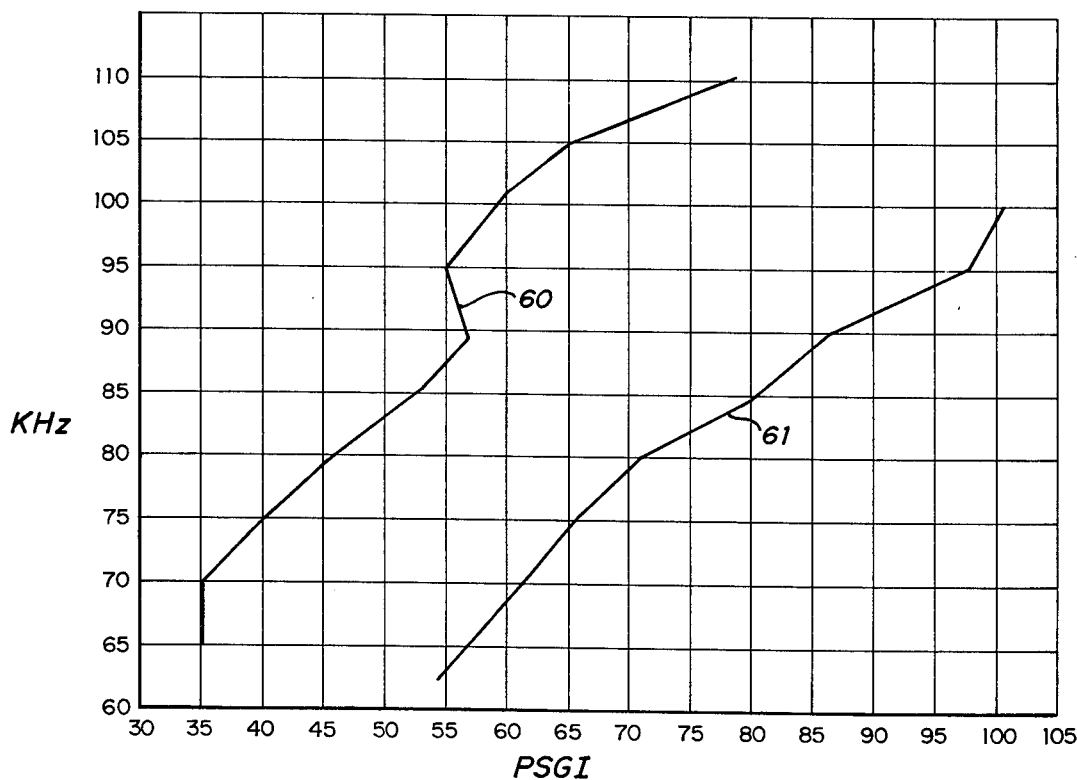
FIG. 6 is a graph of the frequency-pressure operating characteristics of the ink modulator of FIG. 1.

FIG. 6 illustrates graphically the frequency/pressure operating characteristics of an embodiment of the invention.

Curves 60 and 61, respectively, represent the low and high pressures employed in the ink modulator 10 for a drop frequency bandwidth of from 65 KHz to 110 KHz. Within the operating envelope defined by curves 60 and 61, it has been found that no satellite droplets appear and that the droplet break-off point remains within a tolerance of about ±0.02 inch from a substantially linear norm between 65 KHz and 110 KHz. Comparable results have been obtained between 10 KHz and 65 KHz. In addition, although a decrease in modulator efficiency occurs above 110 KHz, reliability superior to that of prior systems has been obtained. Specifically, variations in location of the break-off point remain within a controllable range and sensitivity to temperature change is less acute than with prior systems.

It further has been found that the optimal operating characteristics achieved between 65 KHz and 110 KHz may be substantially repeated above 110 KHz and below 65 KHz by changing the axial length of the ink cavity 13a. More particularly, the length of the ink cavity may be decreased and the transducer voltage increased at frequencies above 110 KHz, and the length of the ink cavity may be increased at frequencies below 65 KHz.

Curves 60 and 61 illustrate a tolerance to ink pressure changes at high frequencies heretofore unknown. At a given drop rate, the ink cavity pressure may be increased to increase the drop velocity for a more uniform character printing without incurring any of the problems of prior systems. Further, in the event that ink splatter ocurs on a given document, the pressure may be lowered at a given drop rate to decrease the drop velocity and thereby eliminate ink splatter. Again, none of the debilitative effects of prior systems are incurred.

FIG. 7

Figure 7:
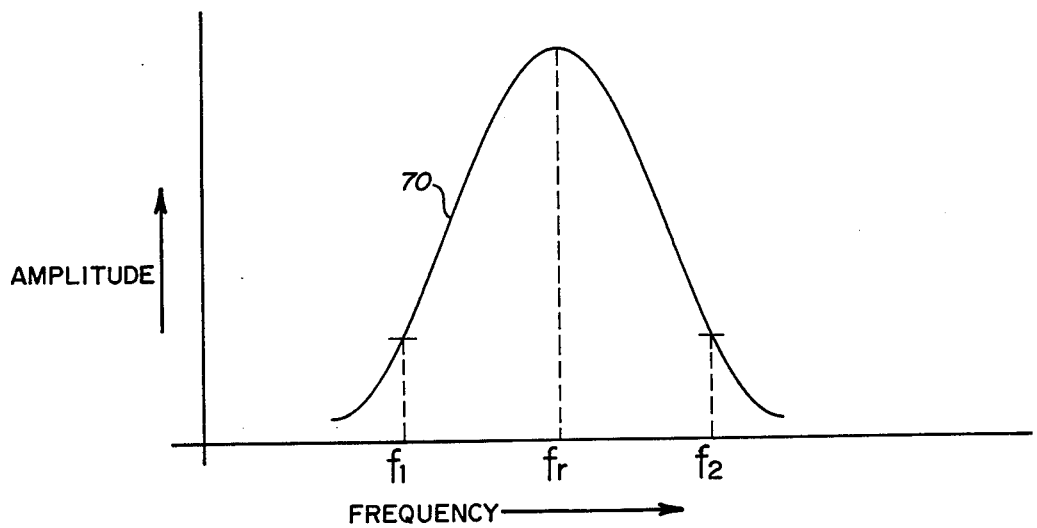
FIG. 7 is an illustration of a mechanical resonance waveform.

FIG. 7 illustrates a mechanical resonance waveform 70.

The modulator systems used heretofore have been found to operate in a narrow bandwidth about the mechanical resonance frequency $f_r$, where a standing acoustical wave occurs in the modulator. Heretofore, temperature changes have caused changes in $f_r$ resulting in break-off point variations of as much as 100%.

A modulator formed in accordance with the present invention operates at frequencies below the one-tenth power frequency $f_1$. More particularly, the longitudinal dimensions of component parts of the modulator are made small compared to the wavelength of the shortest standing longitudinal acoustic wave that may be produced in a structure of the same material as in the respective parts in question, and the overall longitudinal dimension of the modulator is similarly small. The mechanical resonance frequency thereby is removed from the range of operation, and modulator induced variations in the break-off point are substantially eliminated. The only remaining causes of instability in break-off point, including a change of temperature of the ink, induce variations well within the operating tolerances specified herein.

FIG. 8

Figure 8:
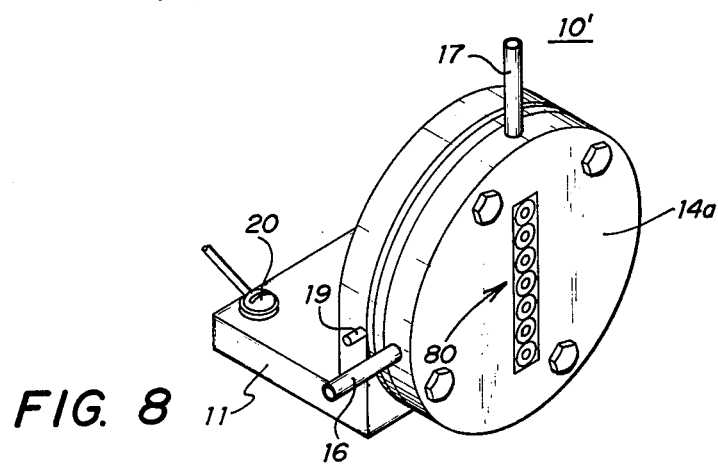
FIG. 8 is a multiple nozzle modulator embodying the invention.

FIG. 8 illustrates a multiple nozzle modulator 101 having plural nozzles 80 which may be laser drilled orifices in a nozzle plate 14a of stainless steel, or be formed as before-described from individual ruby or sapphire jewels. No further modification to modulator 10 is required to construct the multiple nozzle modulator 101. Thus, a single crystal and diaphragm combination operates upon a single ink cavity to uniformly supply ink to a plurality of nozzles. The parallel streams of ink emitted by the plural nozzles break into droplets at approximately the same time at near uniform distances from the orifices. Further, sensitivity to temperature and pressure and drop rate changes are substantially reduced, and the occurrence of satellite droplets is substantially eliminated.

Having described the invention in connection with certain specific embodiments thereof, it is to be understood that further modifications may now suggest themselves to those skilled in the art. For example, while ink jet modulator embodiments have been described herein, the invention may be embodied in any liquid jet modulator wherein the component parts of the modulator have longitudinal dimensions small compared to the wavelength of an acoustical standing wave in the modulator parts. It is intended to cover such modifications as fall within the scope of the appended claims.

What is claimed is:

1. A liquid jet modulator for production of ink droplets over a wide band of high operating frequencies, which comprises:
    a. a housing having a cylindrical well in one face thereof, b. a piezoelectric transducer disc seated in said well and conductively contacting the bottom of said well, c. a disc electrode conductively bonded to the face of said transducer opposite the bottom of said well, d. a flexible diaphragm closing said well, e. a disc adjacent said diaphragm having a bore axially aligned with said well, and f. a plate closing said bore to form a liquid chamber contiguous to said diaphragm and mechanically resonant under ink pressure at a frequency higher than said operating frequency, said plate having an orifice axially aligned with said bore for emitting a stream of liquid from said liquid chamber.

2. The combination set forth in claim 1 wherein the overall longitudinal dimension of said modulator is small compared to the wavelength of the shortest standing longitudinal acoustic wave that can be produced in the assembled body of said modulator.

3. The combination set forth in claim 1 wherein the longitudinal dimensions of said modulator are of a size to accommodate said operating frequencies within a frequency range below the acoustical one-tenth power and mechanical resonance frequencies of said modulator.

4. The combination set forth in claim 1 wherein all longitudinal dimensions of component parts of said modulator are no greater than one-half the wavelength of a standing longitudinal acoustic wave at said operating frequencies in respective ones of said component parts.

5. A wideband ink jet modulator assembly which comprises:

a. a support member, b. an electrical transducer seated in a well in said support member, c. an electrode axially aligned and conductively bonded to said electrical transducer, said electrode having a thickness small compared to the thickness of said electrical transducer and a diameter of the order of said electrical transducer, d. a flexible diaphragm axially aligned with and adhered to said electrode, said diaphragm having a thickness of the order of said electrode and a diameter larger than said electrode, e. a short cylinder for forming an ink chamber axially aligned with and contiguous to said flexible diaphragm, said cylinder having an outside diameter of the order of the diameter of said flexible diaphragm and an inside diameter of the order of said electrical transducer, f. a nozzle plate axially contiguous to said cylinder, said nozzle plate having an outside diameter of the order of the diameter of said cylinder, g. nozzle means seated in an orifice in said nozzle plate for emitting ink from said ink chamber, and h. means to excite said transducer at a frequency such that the wavelength of longitudinal acoustic waves produced thereby is long compared to the largest longitudinal dimension of any element in said assembly.

6. The combination set forth in claim 5 wherein said electrical transducer is a piezoelectric crystal.

7. The combination set forth in claim 5 wherein said nozzle means is a jewel nozzle seated in said nozzle plate and having a conical bore converging to an ink port.

8. The combination set forth in claim 5 wherein the length of said assembly is small compared to the wavelength of said acoustical waves.

9. The combination set forth in claim 5 wherein said nozzle plate has a transverse bore and a first fluid port parallel to the longitudinal axis of said nozzle plate in fluid communication with said first transverse bore and said ink chamber, said nozzle plate also having a second transverse bore displaced from said first transverse bore and a second fluid port parallel to said first fluid port and in fluid communication with said second transverse bore and said ink chamber for selective flow of fluids to said ink chamber.

10. The combination set forth in claim 9 including:

a. a first tube press fitted within said first transverse bore, and b. a second tube press fitted within said second transverse bore.

11. A wideband ink jet modulator which comprises:

a. a support member, b. a transducer seated within said support member, c. an electrode axially aligned and contiguous to said transducer, said electrode having a thickness small compared to the thickness of said transducer and a diameter of the order of the diameter of said transducer, d. a flexible diaphragm axially aligned with and adhered to said electrode, said diaphragm having a thickness of the order of the thickness of said electrode and a diameter larger than the diameter of said electrode, e. a short cylinder for forming an ink chamber axially aligned with and contiguous to said diaphragm, said cylinder having an outside diameter of the order of the diameter of said diaphragm and an inside diameter of the order of the diameter of said transducer, and f. a nozzle plate contiguous to said ink chamber, said nozzle plate having an outside diameter of the order of the outside diameter of said short cylinder and further having a plurality of nozzles in communication with said ink chamber for forming parallel streams of ink.

12. A wideband ink jet modulator having plural nozzles which comprises:

a. a support member for assembling said modulator, said support member having a longitudinal length small compared to the wavelength of a standing longitudinal acoustic wave in said support member, b. a transducer seated within said support member and having a thickness small compared to the wavelength of a standing longitudinal acoustic wave in said transducer, c. an electrode axially aligned and conductively bonded to said transducer, said electrode having a thickness small compared to said transducer and a diameter of the order of said transducer, d. a flexible diaphragm axially aligned with and adhered to said electrode, said diaphragm having a thickness smaller than the wavelength of a standing longitudinal acoustic wave in said diaphragm and a diameter of the order of the width of said support member, e. an ink chamber axially aligned with and contiguous to said diaphragm, said ink chamber having a length small compared to the wavelength of a standing longitudinal acoustic wave in said ink chamber, an outside diameter of the order of said diaphragm and an inside diameter of the order of said transducer, f. a nozzle plate axially aligned with and contiguous to said ink chamber, said nozzle plate having a thickness small compared to the wavelength of a standing longitudinal acoustic wave in said nozzle plate and an outside diameter of the order of said ink chamber, and further having an inner bore, and g. nozzle means seated within said inner bore, said nozzle means having a plurality of orifices for emitting ink from said ink chamber and longitudinal dimensions small compared to the wavelength of a standing longitudinal acoustic wave in said nozzle means.

13. A method of manufacturing a wideband ink jet modulator having component parts including a mount, a transducer, an electrode, a diaphragm, an ink chamber and a nozzle plate which comprises:

a. forming said parts to have longitudinal dimensions small compared to the wavelength of the shortest standing longitudinal acoustic wave that can be established in said parts, b. seating said transducer within said mount with a conductive bonding agent, c. applying a low acoustical impedance material to the edges of said transducer to acoustically decouple said transducer from said mount, d. applying a conductive bonding agent to the surface of said transducer, e. placing said electrode over said transducer and in contact with said conductive bonding agent, f. securing said diaphragm to said electrode with an adhesive, g. placing one end of said ink chamber contiguous to said diaphragm, h. placing said nozzle plate over the opposite end of said ink chamber, and i. mechanically fastening said nozzle plate, said ink chamber and said diaphragm to said mount.

14. The method set forth in claim 13 wherein said mount and said nozzle plate are stainless steel, said diaphragm and said ink chamber are made from polytetrafluoroethylene and said electrode is brass.

15. The method set forth in claim 14 including the step of drilling a plurality of orifices in said nozzle plate to emit ink from said ink chamber.

* * * * *